Figure 1:
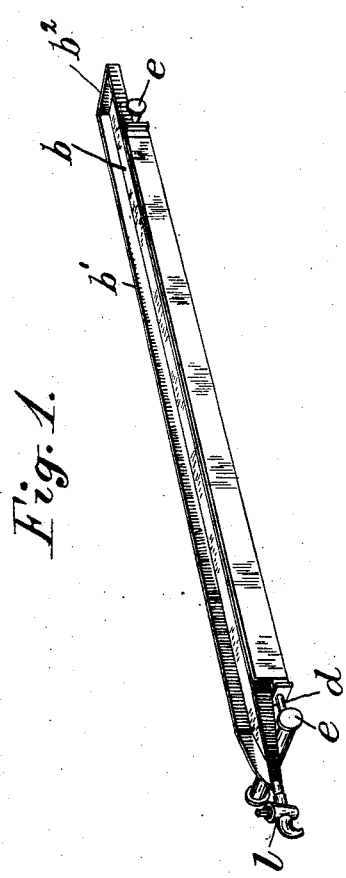

No. 761,603. PATENTED MAY 31, 1904.
W. W. PHARES.
APPARATUS FOR COOLING LIQUIDS.
APPLICATION FILED AUG. 1, 1903.
NO MODEL. 2 SHEETS—SHEET 1.

Attest: Inventor.
L. Lee William W. Phares, per
Arthur F. Heaton Thomas S. Crane, Atty.

No. 761,603. PATENTED MAY 31, 1904.
W. W. PHARES.
APPARATUS FOR COOLING LIQUIDS.
APPLICATION FILED AUG. 1, 1903.
NO MODEL. 2 SHEETS—SHEET 2.
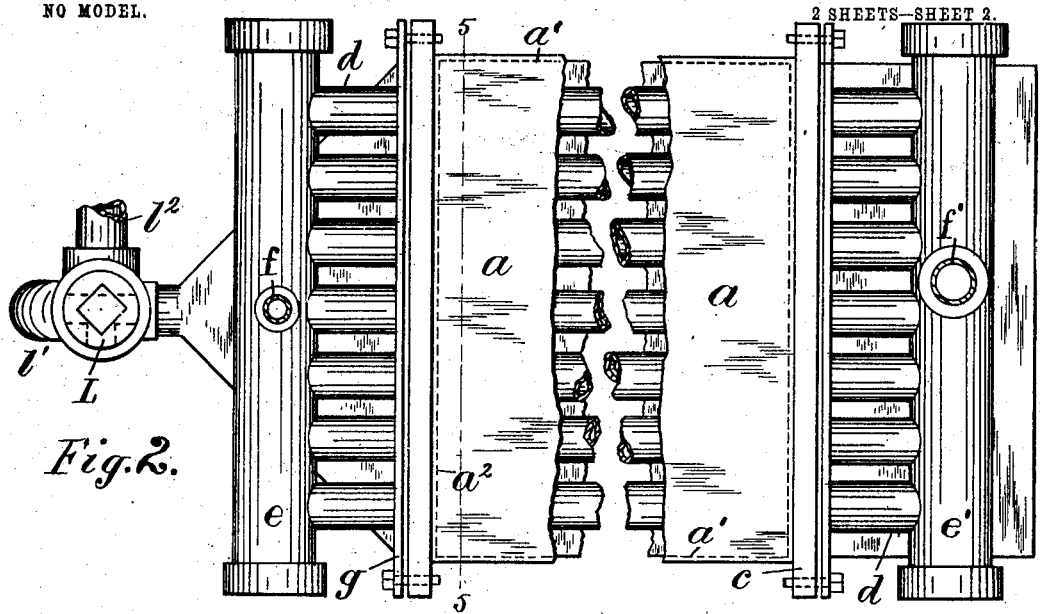
Fig. 2.
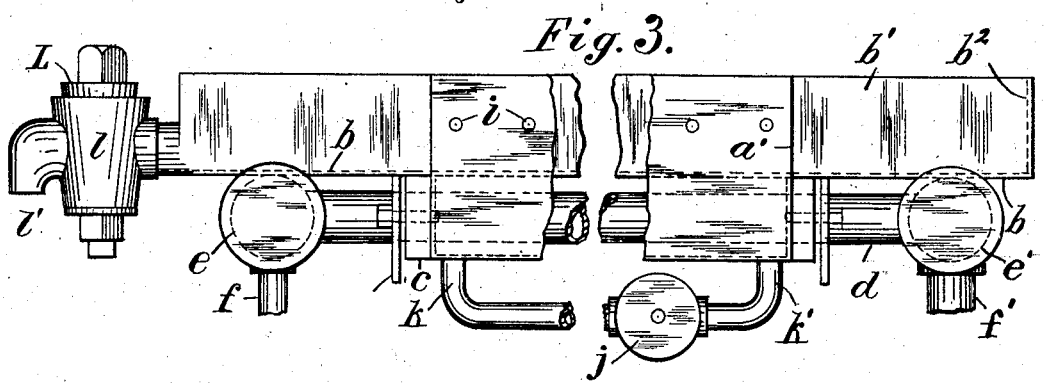
Fig. 3.
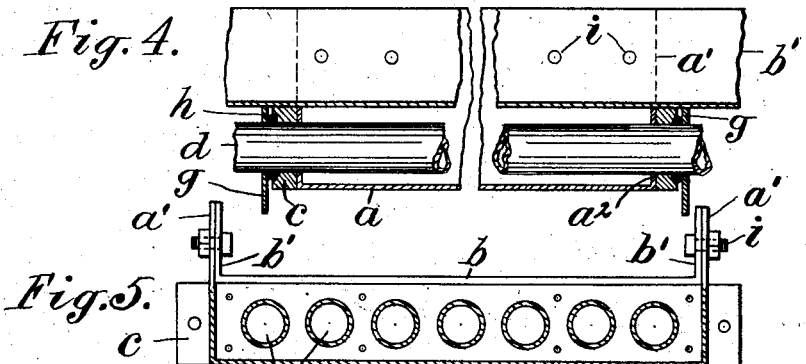
Fig. 4.
Fig. 5.
Attest:
L. Lee
Arthur F. Heaton
Inventor.
William W. Phares, per
Thomas S. Crane, Atty.

No. 761,603. Patented May 31, 1904.

UNITED STATES PATENT OFFICE.

WILLIAM W. PHARES, OF NEW YORK, N. Y., ASSIGNOR OF ONE-HALF TO GEORGE I. HOVEY, OF DEANSBORO, NEW YORK.

APPARATUS FOR COOLING LIQUIDS.

SPECIFICATION forming part of Letters Patent No. 761,603, dated May 31, 1904.

Application filed August 1, 1903. Serial No. 167,814. (No model.)

*To all whom it may concern:*

Be it known that I, WILLIAM W. PHARES, a citizen of the United States, residing at 49 West Forty-fourth street, New York, county of New York, State of New York, have invented certain new and useful Improvements in Apparatus for Cooling Liquids, fully described and represented in the following specification and the accompanying drawings, forming a part of the same.

The present invention was designed especially for cooling condensed milk when discharged from the concentrating-boiler; but the apparatus may be employed in any similar operation to which it is suited.

The object of the invention is to furnish a means of flowing the liquid continuously through a trough forming the top of a cooling-box and to furnish a cheap and effective construction for cooling brine in a box attached to the bottom of the trough, for circulating brine within the box, and for discharging to different receptacles the fluid thus cooled and the wash-water that may be flowed through the trough to cleanse the same. These objects are attained by the construction shown in the annexed drawings, in which—

Figure 1 is a perspective view of the apparatus. Fig. 2 shows the under side of the same without the brine-circulating appliances. Fig. 3 is a side view of the same with the brine-circulating appliances attached, Figs. 1 and 2 being broken in the middle for want of room upon the drawings to indicate the full length of the apparatus. Fig. 4 is a longitudinal section of the brine-box and part of the trough at the center of one of the pipes, the pipe not being in section. Fig. 5 is a cross-section of the apparatus on line 5 5 in Fig. 2 looking toward the cross-bar.

$a$ designates the bottom of the brine-box, which is of rectangular form and has sides $a'$, which are extended above the ends $a^2$ for attachment to the sides $b'$ of the trough $b$, which forms the top of the box. Cross-bars $c$ are riveted to the ends of the box and are perforated for the passage of a tier of pipes $d$, which are shown seven in number, secured at opposite ends to headers $e$ $e'$. The header $e$ is provided with an inlet-pipe $f$ and the header $e'$ with an outlet-pipe $f'$.

A packing-plate $g$ is applied to each of the cross-bars $c$, and the pipes extend through the same and packings $h$ inserted around the pipes between the plates and bars.

The sides $b'$ of the trough are secured detachably to the sides $a'$ of the brine-box by bolts $i$, a packing being inserted between the trough and its lines of junction with the brine-box to confine the brine in the box. The brine-box is supplied with brine, and the brine is cooled by the discharge into the pipes $d$ of liquid ammonia or other cooling agent. The pipes so nearly fill the box, as shown in Fig. 5, that the brine is kept chilled throughout its entire extent and does not, with such proportions of the parts, need to be circulated to maintain an even temperature of the brine.

In Fig. 3 circulating-pipes $k$ and $k'$ are shown connected, respectively, to opposite ends of the brine-box and united to a rotary pump (shown diagrammatically at $j$) to circulate the same brine through the same box continuously, and such circulating device may be used, if required.

The trough is extended over the headers at each end and formed with a cross-plate $b^2$ to close it at the upper end, such end being in practice elevated sufficiently to cause a flow of the liquid which is to be cooled toward the opposite end of the trough. The opposite end of the trough is contracted for connection with a three-way cock $l$, which has an outlet $l'$ extended downward to discharge the milk or other fluid which is cooled by flowing through the trough, and with a lateral outlet connected to a waste-pipe $l^2$ to discharge wash-water.

The plug L of the cock is shown in Fig. 2 (in dotted lines) provided with three outlets, and when turned, as indicated in that figure, furnishes a straight passage from the trough to the discharge-nozzle $l'$. When it is desired to wash out the trough, water is flowed through the same and the cock is turned ninety degrees to discharge the wash-water to the waste-pipe $l^2$. The trough may thus be readily cleansed, as well as the passages through the cock, by flowing hot water through the same when the plug of the cock is suitably turned.

It will be observed that the pipes $d$, the headers $e$, and the cock $l$ are parts which may be found already manufactured and that the remaining parts can be made of sheet metal and bar-iron, so that the invention furnishes an exceedingly cheap construction for an efficient cooling device.

The extension of the sides of the brine-box above the top of the same furnishes a convenient means of securing the trough detachably upon the box to form a cover or top to the same, through which the heat is readily conducted from the liquid which is flowed through the trough. The apparatus thus brings the liquid into the closest proximity with the cooling agent. In practice the brine-box is made sixteen feet long and the pipes eighteen feet long, and the trough may be made eighteen or twenty feet long, so that the liquid flowed through the same passes over a large area of cooling-surface. It is well known that with a brine-box of such length the expansion and contraction of the pipes produces an appreciable variation in their length from time to time, and the object of the packings $h$ held by the plate $g$ is to permit of the requisite movement of the pipes through the ends $c$ of the brine-box without causing leakage at the joints when expansion and contraction occur. My construction is thus simple, cheap, and efficient.

Having thus set forth the nature of the invention, what is claimed herein is—

1. The combination, with the flat brine-box $a$ having the trough $b$ formed upon the top of the same, and having the perforated cross-bars $c$ secured to the ends, of the tier of pipes $d$ extended through the cross-bars, and the packing-plate $g$ applied to the said pipes with packings $h$ to pack the joints of the same, headers outside of the brine-box connecting the ends of the pipes and provided with the inlet $f$ and outlet $f'$, and the trough $b$ being arranged at one end to receive a continuous flow of fluid to be cooled and provided at the opposite end with a discharge-cock, the whole arranged and operated substantially as herein set forth.

2. The combination, with the flat brine-box $a$ having the perforated cross-bars $c$ at its opposite ends and having the sides $a'$ projected above such cross-bars, of the trough $b$ having sides $b'$ secured to the sides $a$ of the brine-box and provided at one end with an outlet-cock, the tier of pipes $d$ extended through the cross-bars, the packing-plate $g$ applied to the said pipes with packings $h$ to pack the joints of the pipes, and headers outside of the brine-trough connecting the ends of the pipes and provided with the inlet $f$ and outlet $f'$, the whole arranged and operated substantially as herein set forth.

3. The combination, with the flat brine-box $a$ having the trough $b$ formed upon the top of the same, and having the perforated cross-bars $c$ secured to the ends, of the tier of pipes $d$ extended through the cross-bars, and the packing-plate $g$ applied to the said pipes with packings $h$ to pack the joints of the same, headers outside of the brine-box connecting the ends of the pipes and provided with the inlet $f$ and outlet $f'$, the brine-box having the pipes $k$ and $k'$ connected with a pump $j$ to circulate the brine through the box, and the trough $b$ being adapted at one end to receive a continuous flow of fluid to be cooled, and provided at the opposite end with a discharge-cock, substantially as herein set forth.

4. The combination, with the flat brine-box $a$ having the trough $b$ formed upon the top of the same, and having the perforated cross-bars $c$ secured to the ends, of the tiers of pipes $d$ extended through the cross-bars, and the packing-plate $g$ applied to the said pipes with packings $h$ to pack the joints of the same, headers outside of the brine-box connecting the ends of the pipes and provided with the inlet $f$ and outlet $f'$, and the trough $b$ being arranged at one end to receive a continuous flow of fluid to be cooled, and provided at the opposite end with the three-way cock L adapted to discharge into separate receptacles the cooled liquid and the wash-water used for cleansing the trough.

In testimony whereof I have hereunto set my hand in the presence of two subscribing witnesses.

WILLIAM W. PHARES.

Witnesses:
L. LEE,
THOS. S. CRANE.